July 29, 1952 J. J. LENTZ 2,605,405

PULSE FORMING CIRCUIT

Filed Dec. 10, 1945

INVENTOR
JOHN J. LENTZ

BY M.O. Hayes

ATTORNEY

Patented July 29, 1952

2,605,405

UNITED STATES PATENT OFFICE 2,605,405

PULSE FORMING CIRCUIT

John J. Lentz, Boston, Mass., assignor, by mesne assignments, to the United States of America as represented by the Secretary of the Navy Application December 10, 1945, Serial No. 634,113

2 Claims. (Cl. 250—27)

This invention relates to electrical pulse forming circuits, and more particularly to circuits for creating variable length voltage pulses of extremely short time duration.

In a number of electronic systems now known to the art it is desirable to produce voltage pulses of short time duration. For example, such pulses may be used as synchronization pulses in television circuits or to control the transmitting oscillators of radar systems. In such applications pulse forming circuits are usually limited as to the shortest time duration pulse which they can produce, and as to the steepness of the leading and trailing edges of such pulses. It is desirable to provide a pulse forming circuit which will avoid the limitations mentioned above.

Accordingly, it is an object of the present invention to provide a pulse forming circuit which will create a substantially rectangular pulse from another pulse of equal or greater time duration.

It is also an object of this invention to provide a pulse forming circuit for transforming a given trigger pulse into a substantially rectangular voltage pulse of variable time duration.

The above and further objects of this invention will become apparent by reference to the following detailed description of two embodiments thereof and the appended drawings, of which:

Figure 1:
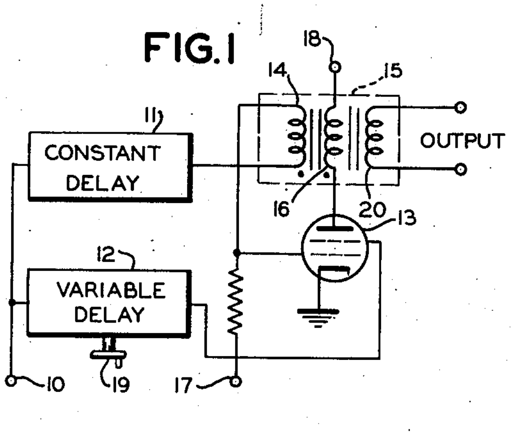
Fig. 1 is a schematic circuit diagram of one embodiment of this invention.
Figure 2:
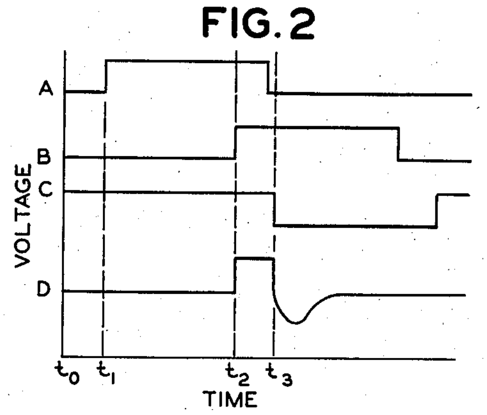
Fig. 2 is a chart showing the time relationships of the voltage pulses in the embodiment of Fig. 1.

In Fig. 1 a positive trigger voltage obtained at terminal 10 is applied simultaneously to two delay devices 11 and 12. Delay device 11 produces a positive pulse delayed by some constant time and this output is applied to the first control grid of electron tube 13, being connected thereto through secondary coil 14 of pulse transformer 15. The first grid of tube 13 is biased to cut-off by a negative potential connected at terminal 17. The primary coil 16 of pulse transformer 15 is in the plate circuit of tube 13, connecting the plate to a positive potential source applied at terminal 18. The output of delay device 12 is a negative pulse delayed by a variable time, the magnitude of the delay being adjusted by delay control 19, and this pulse is applied to the second control grid of tube 13. A preferred form of delay device 12 is a delay multivibrator, the duration of the delay then being capable of control by a voltage, but other forms of variable delay devices are equally applicable. Referring to Fig. 2, the trigger voltage A is applied to delay devices 11 and 12 at a time $t_1$. There results from delay device 11 a positive pulse B, beginning at time $t_2$ (Fig. 2), which applied to the first grid of tube 13 through secondary 14 causes tube 13 to go into conduction, drawing current through primary 16. At a time $t_3$ a negative pulse C is applied to the second grid of tube 13 by delay device 12, cutting off tube 13 and stopping the current flow through primary 16. The voltage generated in primary 16 of transformer 15 due to the current drawn by tube 13 is fed back regeneratively to the grid of tube 13 due to the close inductive coupling between primary 16 and secondary 14. This regenerative action causes the current through primary 16 to increase linearly, thus providing a constant voltage output across secondary 20. When the current through primary 16 is cut off by pulse C, the voltage across secondary 20 will go suddenly negative and then return to zero as shown by wave form D in Fig. 2. This results in an output pulse from secondary 20 having sharp leading and trailing edges and a time duration equal to $(t_3-t_2)$. The negative going portion of the output pulse from secondary 20 can be reduced by circuit techniques well known in the art. Other outputs from the pulse forming circuits are possible, for example, the output can be taken across a small load resistor in the cathode circuit of tube 13 in which case there would be no negative trailing portion in the output pulse.

It is possible by the embodiment of Fig. 1 to form a pulse which is longer than the trigger pulse applied to the circuit. The inductive coupling between primary 16 and secondary 14 of transformer 15 is sufficiently close that the initial pulse from delay device 11 will cause the circuit of transformer 15 to go into oscillation. A sufficiently large negative pulse from delay device 12 will stop this oscillation. This makes possible an output pulse of any duration shorter than the half-period of the oscillation which would occur if the process were not interrupted by the negative trigger from delay device 12.

Figure 3:
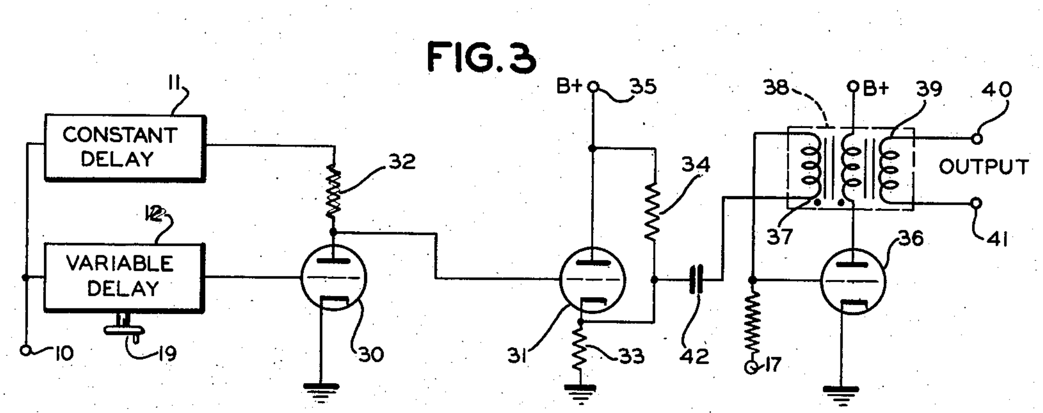
Fig. 3 is a schematic circuit diagram of a second embodiment.

Fig. 3 is a schematic circuit diagram of a second embodiment of the invention. The positive trigger voltage is applied to terminal 10 and is fed simultaneously to two delay devices 11 and 12 as in the embodiment of Fig. 1. Delay device 11 produces a positive pulse delayed by a constant time and this pulse is applied to the plate of electron tube 30, being connected thereto by resistor 32. Delay device 12 produces a positive pulse delayed by a variable time, the magnitude of this delay being controlled by delay control 19 and being normally greater than the delay introduced by delay device 11. The output of delay device 12 is coupled to the grid of tube 30 and increases the current drawn by this tube causing a drop in the potential at its plate. The mixing action of tube 30 results in an output at its plate of a positive rectangular pulse having a time duration equal to the difference between the delays introduced by delay devices 11 and 12.

The pulse formed at the plate of tube 30 may be directly coupled to the circuits which it is desired to control, or may be fed through a pulse amplifier one form of which is incorporated into the circuit of Fig. 3. In this embodiment the positive pulse from the plate of tube 30 is coupled directly to the control grid of electron tube 31 overcoming the cathode bias established by a voltage divider consisting of resistors 33 and 34 and a positive potential applied at terminal 35. Tube 31 is connected as a cathode follower, and the input to its grid is reproduced at its cathode, this positive pulse being connected to the grid of electron tube 36 through condenser 42 and secondary coil 37 of pulse transformer 38. Tube 36 and pulse transformer 38 form a pulse amplifier operating in a fashion similar to that formed by tube 13 and transformer 15 in Fig. 1, with the difference that the inductive coupling between plate and grid circuits is not as great so that the conduction of tube 36 (Fig. 3) is controlled solely by the short positive pulse on its one control grid. The output of secondary coil 39 to terminals 40 and 41 is a pulse with very steep leading and trailing edges and having the same time duration as the pulse at the plate of tube 30.

Figure 4:
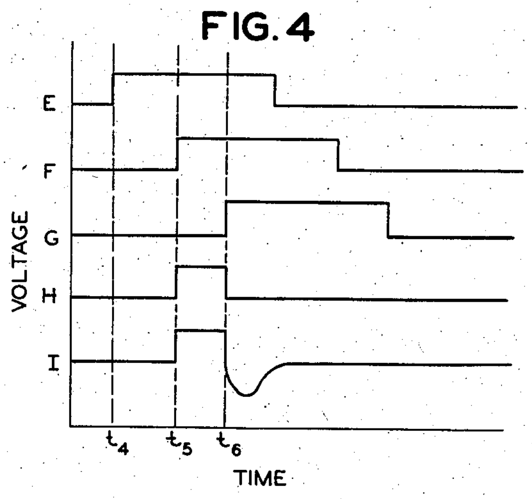
Fig. 4 is a chart showing the time relationships of the voltage pulses in the system of Fig. 3.

The time relationships of the various voltage pulses in the circuit of Fig. 3 are shown in Fig. 4. The trigger pulse E is applied at terminal 10 beginning at a time $t_4$ resulting in an output pulse F from delay device 11 beginning at a later time $t_5$, the delay of delay device 11 being equal to $(t_5-t_4)$. At some later time $t_6$ the output pulse G from delay device 12 begins, increasing the conduction of tube 30. The combined action of pulses F and G causes a pulse H having a time duration equal to $(t-t_5)$ at the place of tube 30. In this embodiment this output is further amplified and given steeper leading and trailing edges by the pulse amplifier shown. Pulse H is applied to the grid of tube 31, is reproduced at its cathode, and is used to control the conduction of tube 36. The output of secondary 39 of transformer 38 is shown as pulse I, having a time duration equal to $(t_6-t_5)$, the negative going trailing portion of pulse H being due to the sudden stopping of the current drawn through the primary of transformer 38. The magnitude of the output pulse from delay device 12 required by the circuit of Fig. 3 is considerably less than that required by the circuit of Fig. 1. As in the embodiment of Fig. 1 the output circuit may be properly loaded to reduce the negative trailing portion of the pulse, or the output may be taken from the pulse amplifier in a manner different than that described.

The above description of two embodiments of the present invention are for the purpose of illustrating the principles thereof. Other embodiments and modifications will be apparent to those skilled in the art and no attempt has been made to exhaust such possibilities. The scope of the invention is defined by the appended claims.

What is claimed is:

1. A pulse forming circuit comprising, a first delay device adapted to delay an input pulse by a constant amount, a second delay device adapted to delay said input pulse by a variable amount, an electron tube having a plate, control grid, and cathode, the output of said first delay device being connected to energize the plate circuit of said electron tube, the output of said second delay device being connected to bias said control grid of said electron tube, the output of said electron tube being a voltage pulse having a duration equal to the difference between the delays introduced by said first and second delay devices.

2. A pulse forming circuit comprising, a first delay device adapted to delay an input pulse by a constant amount, a second delay device adapted to delay an input pulse by a variable amount, an electron tube pulse amplifier having at least a control grid, cathode, and anode and adapted to be controlled by said two delayed pulses to form an output pulse having a time duration equal to the difference in the delays introduced by said first and second delay devices, means for applying the output of said variable delay device directly to bias said control grid, and means for applying the output of said constant delay device to energize said plate of said electron tube.

JOHN J. LENTZ.

REFERENCES CITED

The following references are of record in the file of this patent:

UNITED STATES PATENTS

| Number | Name | Date |
|---|---|---|
| 2,175,335 | Andrieu | Oct. 10, 1939 |
| 2,212,967 | White | Aug. 27, 1940 |